(12) United States Patent
Kim et al.

(10) Patent No.: US 9,382,334 B2
(45) Date of Patent: Jul. 5, 2016

(54) OPTICAL FILM

(71) Applicant: SK Innovation Co., Ltd., Seoul (KR)

(72) Inventors: Myoung Lae Kim, Daejeon (KR); Hyuk Jun Kim, Daejeon (KR); Won Yeob Kim, Daejeon (KR); Min Joung Im, Busan (KR); Yeong Min Jo, Seoul (KR); Seung Eon Lee, Daejeon (KR); Hyo Shin Kwak, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 64 days.

(21) Appl. No.: 14/370,863

(22) PCT Filed: Jan. 4, 2013

(86) PCT No.: PCT/KR2013/000038
§ 371 (c)(1),
(2) Date: Jul. 7, 2014

(87) PCT Pub. No.: WO2013/103251
PCT Pub. Date: Jul. 11, 2013

(65) Prior Publication Data
US 2015/0004333 A1 Jan. 1, 2015

(30) Foreign Application Priority Data
Jan. 6, 2012 (KR) .......................... 10-2012-0001851

(51) Int. Cl.
| | |
|---|---|
| *C09K 19/00* | (2006.01) |
| *C08B 3/00* | (2006.01) |
| *C08B 3/14* | (2006.01) |
| *C08J 5/18* | (2006.01) |
| *C08L 1/10* | (2006.01) |
| *G02B 5/30* | (2006.01) |
| *G02F 1/1335* | (2006.01) |
| *G02F 1/13363* | (2006.01) |
| *C08B 5/00* | (2006.01) |
| *C08B 15/05* | (2006.01) |
| *C08L 1/14* | (2006.01) |
| *G02B 1/04* | (2006.01) |

(52) U.S. Cl.
CPC ... *C08B 3/00* (2013.01); *C08B 3/14* (2013.01); *C08B 5/00* (2013.01); *C08B 15/05* (2013.01); *C08J 5/18* (2013.01); *C08L 1/10* (2013.01); *C08L 1/14* (2013.01); *G02B 5/305* (2013.01); *G02B 5/3083* (2013.01); *G02F 1/133528* (2013.01); *G02F 1/133634* (2013.01); *C08J 2301/14* (2013.01); *G02B 1/04* (2013.01); *G02F 2201/50* (2013.01); *Y10T 428/10* (2015.01)

(58) Field of Classification Search
CPC .............. Y10T 428/10; Y10T 428/105; Y10T 428/1036; Y10T 428/1045; Y10T 428/1086; B32B 2457/202; G02F 1/133634; G02F 1/1395; G02F 1/133528; G02F 2001/133531; G02F 2201/50; C08B 15/05; G02B 5/305; G02B 5/3083; C08L 1/10; C08L 1/12; C08L 1/14; C08L 1/16
USPC ............. 428/1.1, 1.3, 1.32, 1.33, 1.6; 536/48, 536/58; 349/96, 117, 118, 158
See application file for complete search history.

(56) References Cited

U.S. PATENT DOCUMENTS 2,532,622 A * 12/1950 Hunter ............................ 536/58
2008/0309860 A1 12/2008 Nimura et al.

FOREIGN PATENT DOCUMENTS

| | | | |
|---|---|---|---|
| JP | 2004131637 A | * | 4/2004 |
| KR | 20030060787 A | | 7/2003 |
| KR | 1020100006837 A | | 1/2010 |
| KR | 1020100053596 A | | 5/2010 |
| KR | 1020110075991 A | | 7/2011 |
| WO | 2009031464 A1 | | 3/2009 |

* cited by examiner

*Primary Examiner* — Ruiyun Zhang
(74) *Attorney, Agent, or Firm* — The Webb Law Firm

(57) ABSTRACT

Provided are an optical film using a cellulose derivative, useful in an image display device, such as a liquid crystal display or the like, a retardation film and a polarization film using the optical film, and a liquid crystal display having excellent view angle characteristics by using these films, while the optical film uses a cellulose derivative resin in which some hydrogen atoms of hydroxy groups of cellulose are substituted with three or more kinds of substituents.

10 Claims, No Drawings

OPTICAL FILM

CROSS-REFERENCE TO RELATED APPLICATIONS

This application is the United States national phase of International Application No. PCT/KR2013/000038 filed Jan. 4, 2013, and claims priority to Korean Patent Application No. 10-2012-0001851 filed Jan. 6, 2012, the disclosures of which are hereby incorporated in their entirety by reference.

TECHNICAL FIELD

The following disclosure relates to an optical film using a cellulose derivative, useful in an image display device, such as a liquid crystal display or the like, a retardation film and a polarization film using the optical film, and a liquid crystal display having excellent view angle characteristics by using these films.

BACKGROUND ART

A cellulose acetate film has lower optical anisotropy and thus provides lower retardation in comparison with other polymer films. Therefore, it is used in a polarization film or the like.

Recently, a liquid crystal display is increasingly required to have picture improvement and high functions, and a material therefor, that is, a cellulose acetate film for a polarization film is also required to have characteristics satisfying this. Particularly, with respect to an in plain switching (IPS) mode liquid crystal display, as one method for solving chromaticity shift problems and improving contrast ratio, a cellulose acetate film is required to have a low optical anisotropic value (Re: retardation value in-plane of the film, Rth: retardation value in the thickness direction of the film).

The cellulose acetate film has relatively low retardation, but may not achieve a low degree of retardation, which is requested as a retardation film, and thus, a retardation regulator needs to be added. WO 2009/031464 discloses that in cellulose acylates having a total acyl substitution degree of 2.7~2.95, several kinds of materials having different substitution degrees with respect to a sugar ester compound, in which hydroxy groups of monosaccharide~trisaccharide are partially esterfied, are mixed and used as a retardation regulator.

However, problems such as bleeding and the like may occur at the time of adding the retardation regulator, and thus a measure for improving this is needed.

PATENT DOCUMENT

WO 2009/031464 (2009 Mar. 12)

DISCLOSURE OF INVENTION

Technical Problem

An embodiment of the present invention is directed to providing an optical film having a low retardation value in a thickness direction thereof. More specifically, an embodiment of the present invention is directed to providing an optical compensation film capable of being used in an IPS mode liquid crystal display and improving view angle characteristics of an IPS mode LCD panel.

Further, another embodiment of the present invention is directed to providing an optical film capable of regulating retardation by using a resin itself without adding an additive in order to satisfy the above optical characteristics.

Further, still another embodiment of the present invention is directed to providing an optical compensation sheet, a polarization plate, and a liquid crystal display, using the optical film.

Solution to Problem

An embodiment of the present invention is directed to providing an optical film using, as a base resin, a cellulose ester resin in which some hydrogen atoms of hydroxy groups of cellulose having a repeating unit of General Formula 1 below are substituted with three kinds of substituents:

[General Formula 1]

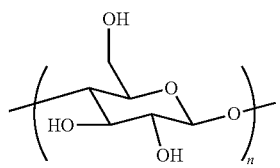

Specifically, in one general aspect, there is provided an optical film including a cellulose ester resin in which some hydrogen atoms of hydroxy groups of cellulose are substituted with two kinds of acyl groups selected from an acetyl group and a propionyl group, or an acetyl group and a butyryl group, and some hydrogen atoms of the other hydroxy groups not substituted with the acyl groups are substituted with substituents selected from Chemical Formula 1 or Chemical Formula 2:

[Chemical Formula 1]

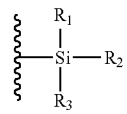

(In Chemical Formula 1, $R_1$, $R_2$ and $R_3$ each are independently selected from H, (C1-C10)alkyl, and (C6-C30)aryl; and the alkyl and aryl may be further substituted with at least one of (C1-C10)alkyl, halogen, nitro, cyano, hydroxy, amino, (C6-C30)aryl, (C2-C10)alkenyl, (C3-C20)cycloalkyl, 5-membered to 7-membered heterocycloalkyl containing at least one atom selected from N, O, and S, or (C4-C30)heteroaryl containing at least one atom selected from N, O, and S),

[Chemical Formula 2]

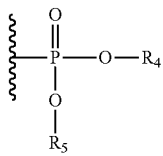

(In Chemical Formula 2, $R_4$ and $R_5$ each are independently selected from (C1-C10)alkyl and (C6-C30)aryl; and the alkyl and aryl may be further substituted with at least one of (C1-C10)alkyl, halogen, nitro, cyano, hydroxy, amino, (C6-C30) aryl, (C2-C10)alkenyl, (C3-C20)cycloalkyl, 5-membered to 7-membered heterocycloalkyl containing at least one atom selected from N, O, and S, or (C4-C30)heteroaryl containing at least one atom selected from N, O, and S).

In the present invention, substitution degrees of the acyl groups may satisfy Equations 1 to 4 below and a substitution degree of a substituent selected from Chemical Formula 1 or Chemical Formula 2 below may satisfy 0.01~1.0:

$1.9 \leq DSac+DSpr < 2.8$ [Equation 1]

$1.9 \leq DSac+DSbu < 2.8$ [Equation 2]

$1.8 \leq DSpr < 2.7$ [Equation 3]

$1.6 \leq DSbu < 2.7$ [Equation 4]

(In Equations 1 to 4, DSac means substitution degree of acetyl group, DSpr means substitution degree of propionyl group, and DSbu means substitution degree of butyryl group).

In the optical film of the present invention, the cellulose ester resin itself has a substituent capable of lowering retardation, and thus there can be provided an optical film having low retardation even without including a separate additive. Here, the substituted cellulose ester resin may be used alone or the substituted cellulose ester resin and a cellulose triacetate resin may be used by mixture. In the case where they are used by mixture, the optical film may further include 5~50 parts by weight of the cellulose triacetate resin based on 100 parts by weight of the cellulose ester resin.

In another general aspect, there is provided an optical compensation sheet including the optical film described above.

In still another general aspect, there is provided a retardation film including the optical film described above.

In still another general aspect, there is provided a polarization plate including the optical film described above.

In still another general aspect, there is provided a liquid crystal display including the optical film described above.

Advantageous Effects of Invention

As set forth above, according to the optical film of the present invention, optical anisotropy of the cellulose resin can be controlled by regulating the kinds of substituents and the substitution degrees thereof, so that there can be provided an optical film capable of regulating retardation even without the addition of a retardation regulator.

MODE FOR THE INVENTION

Hereinafter, the present invention will be described in more detail.

The present invention is directed to an optical film using a cellulose ester resin in which some hydrogen atoms of hydroxy groups of cellulose are substituted with acyl groups, particularly, an acetyl group and a propionyl group or an acetyl group and a butyryl group, and some hydrogen atoms of the other hydroxy groups not substituted with the acyl groups are substituted with at least one kind of substituents except an acyl group, and thus finally the number of kinds of substituents is 3 or more.

More specifically, the present invention is directed to an optical film including a cellulose ester resin in which some hydrogen atoms of hydroxy groups of cellulose are substituted with two kinds of acyl groups selected from an acetyl group and a propionyl group, or an acetyl group and a butyryl group, and some hydrogen atoms of the other hydroxy groups not substituted with the acyl groups are substituted with substituents selected from Chemical Formula 1 or Chemical Formula 2, wherein substitution degrees of the acyl groups satisfy Equations 1 to 4 below, and a total substitution degree of the substituents except the acyl groups is 0.01~1.0:

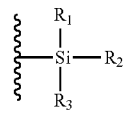

[Chemical Formula 1]

(In Chemical Formula 1, $R_1$, $R_2$ and $R_3$ each are independently selected from H, (C1-C10)alkyl, and (C6-C30)aryl; and the alkyl and aryl may be further substituted with at least one of (C1-C10)alkyl, halogen, nitro, cyano, hydroxy, amino, (C6-C30)aryl, (C2-C10)alkenyl, (C3-C20)cycloalkyl, 5-membered to 7-membered heterocycloalkyl containing at least one atom selected from N, O, and S, or (C4-C30)heteroaryl containing at least one atom selected from N, O, and S),

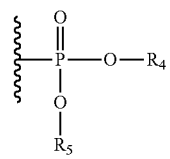

[Chemical Formula 2]

(In Chemical Formula 2, $R_4$ and $R_5$ each are independently selected from (C1-C10)alkyl and (C6-C30)aryl; and the alkyl and aryl may be further substituted with at least one of (C1-C10)alkyl, halogen, nitro, cyano, hydroxy, amino, (C6-C30) aryl, (C2-C10)alkenyl, (C3-C20)cycloalkyl, 5-membered to 7-membered heterocycloalkyl containing at least one atom selected from N, O, and S, or (C4-C30)heteroaryl containing at least one atom selected from N, O, and S), $1.9 \leq DSac+DSpr < 2.8$ [Equation 1]

$1.9 \leq DSac+DSbu < 2.8$ [Equation 2]

$1.8 \leq DSpr < 2.7$ [Equation 3]

$1.6 \leq DSbu < 2.7$ [Equation 4]

(In Equations 1 to 4, DSac means substitution degree of acetyl group, DSpr means substitution degree of propionyl group, and DSbu means substitution degree of butyryl group).

The optical film of the present invention contains, as a main component, a cellulose ester resin including three or more kinds of substituents above. In the present invention, the expression contain as a main component' means that the cellulose ester resin may be composed of only a cellulose ester resin including three or more kinds of substituents or other resins in addition to it while it is used at the highest ratio, specifically, 50 wt % or higher.

That is, in General Formula 2 below, R may be substituted with an acetyl group (—CO—CH$_3$) and a propionyl group (—CO—CH$_2$CH$_2$CH$_3$) or an acetyl group (—CO—CH$_3$) and a butyryl group (—CO—CH$_2$CH$_2$CH$_2$CH$_3$), and here, the substitution degrees thereof may satisfy Equations 1 to 4 above. Some of Rs not substituted with the acyl groups may be substituted with at least one kind of substituents selected from Chemical Formula 1 or Chemical Formula 2 and here, the substitution degree thereof may be 0.01~1.0.

[General Formula 2]

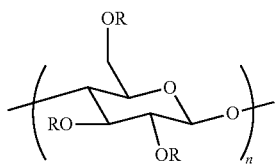

The substitution degree employed in the present invention is measured according to the D-817-91 of ASTM.

In the present invention, a total substitution degree of the cellulose ester resin is preferably 2.5 to 3.0, and, here, the substitution degrees of the acyl groups preferably satisfy Equations 1 to 4 above.

Specifically, in the present invention, in the case of substitution with the acetyl group and the propionyl group in the acyl groups, the substitution degree preferably satisfies Equation 1 below and, here, the substitution degree of the propionyl group preferably satisfies Equation 3 below:

$1.9 \leq DSac+DSpr < 2.8$ [Equation 1]

$1.8 \leq DSpr < 2.7$ [Equation 3]

(In the equations above, DSac means substitution degree of acetyl group and DSpr means substitution degree of propionyl group).

In addition, in the present invention, in the case of substitution with an acetyl group and a butyryl group, the substitution degree preferably satisfies Equation 2 below, and, here, the substitution degree of the butyryl group preferably satisfies Equation 4 below:

$1.9 \leq DSac+DSbu < 2.8$ [Equation 2]

$1.6 \leq DSbu < 2.7$ [Equation 4]

(In the equations above, DSac means substitution degree of acetyl group and DSbu means substitution degree of butyryl group).

In addition, a total substitution degree of at least one kind of substituent selected from Chemical Formula 1 or Chemical Formula 2, except for the acyl groups, is preferably 0.01~1.0. The retardation reduction effect can be sufficiently exhibited even without adding a separate additive in the above range, and if the total substitution degree is above 1.0, film stiffness may be increased, resulting in deteriorating process performance.

The present invention is controlled to have three or more kinds of substituents, specifically, three or more kinds of substituents composed of two or more kinds of acyl groups and another substituent except for the acyl groups, so that retardation can be regulated by using the resin itself even without using a further retardation additive.

In the present invention, Chemical Formula 1 or Chemical Formula 2 will be described in more detail.

[Chemical Formula 1]

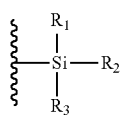

(In Chemical Formula 1, $R_1$, $R_2$ and $R_3$ each are independently selected from H, (C1-C10)alkyl, and (C6-C30)aryl; and the alkyl and aryl may be further substituted with at least one of (C1-C10)alkyl, halogen, nitro, cyano, hydroxy, amino, (C6-C30)aryl, (C2-C10)alkenyl, (C3-C20)cycloalkyl, 5-membered to 7-membered heterocycloalkyl containing at least one atom selected from N, O, and S, or (C4-C30)heteroaryl containing at least one atom selected from N, O, and S).

[Chemical Formula 2]

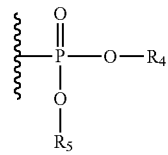

(In Chemical Formula 2, $R_4$ and $R_5$ each are independently selected from (C1-C10)alkyl and (C6-C30)aryl; and the alkyl and aryl may be further substituted with at least one of (C1-C10)alkyl, halogen, nitro, cyano, hydroxy, amino, (C6-C30)aryl, (C2-C10)alkenyl, (C3-C20)cycloalkyl, 5-membered to 7-membered heterocycloalkyl containing at least one atom selected from N, O, and S, or (C4-C30)heteroaryl containing at least one atom selected from N, O, and S).

The alkyl and other substituents including an alkyl portion, described in the present invention, include all a straight or branched chain type.

The term aryl described in the present invention is an organic radical derived from aromatic hydrocarbon by the removal of one hydrogen atom, and may include a single ring or a fused ring containing, properly 4 to 7 ring atoms, and preferably 5 or 6 ring atoms for each ring. Specific examples thereof may include phenyl, naphthyl, biphenyl, tolyl, and the like, but are not limited thereto.

Heteroaryl described in the present invention means an aryl group including 1 to 3 hetero atoms selected from N, O, and S as an aromatic ring skeleton atom and carbon as the other aromatic ring skeleton atom. The heteroaryl group includes a divalent aryl group of which hetero atoms in the ring are oxidized and quarternized, to form for example N-oxide or a quaternary salt. Specific examples thereof include furyl, thiophenyl, pyrolyl, pyranyl, imidazolyl, pyrazolyl, thiazolyl, thiadiazolyl, isothiazolyl, isoxazolyl, oxazolyl, oxadiazolyl, triazinyl, tetrazinyl, triazolyl, tetrazolyl, furazanyl, pyridyl, pyrazinyl, pyrimidinyl, pyridazinyl, and the like, but are not limited thereto.

More specifically, in Chemical Formula 1, $R_1$, $R_2$ and $R_3$ each are independently selected from (C1-C10)alkyl and (C6-C30)aryl, and for a specific example, Chemical Formula 1 includes t-butyldiphenylsilyl, t-butyldimethylsilyl, trimethylsilyl, triethylsilyl, triisopropylsilyl, dimethylisopropylsilyl, diethylisopropylsilyl, tribenzylsilyl, triphenylsilyl, diphenylmethylsilyl, di-t-butylmethylsilyl, and the like, of Chemical Formula 1-1 below.

[Chemical Formula 1-1]

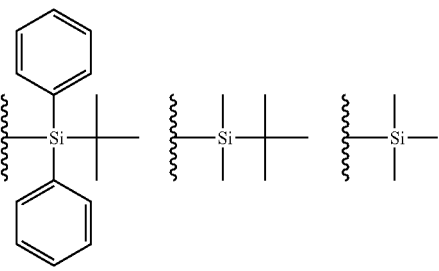

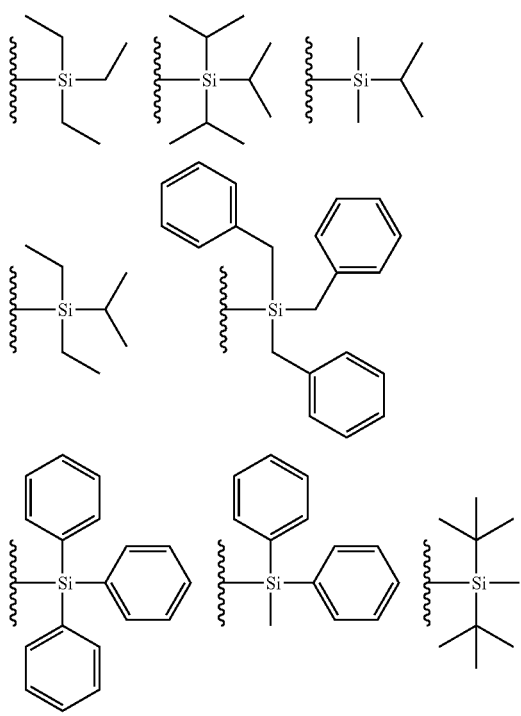

In addition, in Chemical Formula 2, R4 and R5 each are independently selected from (C1-C10)alkyl and (C6-C30) aryl. Specific examples thereof include diethylphosphoryl, dimethylphosphoryl, diphenylphosphoryl, dibenzylphosphoryl, diisopropylphosphoryl, diisobutylphosphoryl, and the like, of Chemical Formula 2-1 below.

[Chemical Formula 2-1]

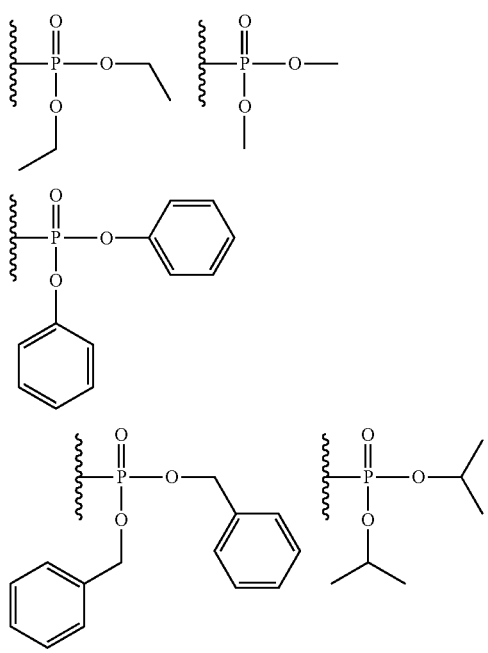

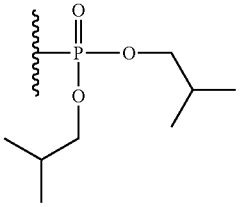

In the present invention, the molecular weight range of the cellulose ester resin is not limited, but the weight average molecular weight thereof is preferably 150,000 or more, and more preferably, the weight average molecular weight thereof is 150,000~400,000. If the weight average molecular weight is low, mechanical stiffness of the film is lowered. If too high, solubility is decreased. In addition, the molecular weight distribution of the cellulose ester resin, Mw/Mn, (Mw is weight average molecular weight and Mn is number average molecular weight), is preferably 1.2~2.0, and more preferably 1.4~1.8. The weight average molecular weight means a value measured by GPC when methylene chloride is used as a solvent.

The optical film using the cellulose ester resin of the present invention is preferably manufactured by a solvent casting method using a dope solution. According to the solvent cast method, a film is formed by casting a solution (dope), in which a cellulose acetate resin is dissolved in a solvent, on a supporter, and then evaporating the solvent.

Preferably, the dope solution is prepared after the cellulose ester resin is dried such that the moisture content thereof becomes 2 wt % or less, and more preferably 1 wt % or less.

Next, an additive used in the optical film of the present invention will be described.

In the cellulose ester solution (dope) used in the solvent cast method, various kinds of additives according to the uses of respective preparing processes, for example, a plasticizer, a UV inhibitor, a deterioration inhibitor, a minute particle, a stripping agent, an infrared absorber, and the like may be added. Specific kinds of these additives are not limited as long as they are usually used in the art, and the contents thereof may be preferably in the range in which physical properties of the film are not deteriorated. The time for adding the additives is determined depending on the kind of additive. The additives may be added at the last stage of preparing the dope.

The plasticizer is used for controlling mechanical properties of the film, and in the case of using the plasticizer, the drying process time of the film may be shortened. Any one plasticizer may be used without limitation as long as it is usually used. Examples thereof may include phosphoric acid ester, carboxylic acid ester selected from phthalic acid ester and citric acid ester, and the like. Examples of phosphoric acid ester may be triphenyl phosphate (TPP), biphenyldiphenyl phosphate, tricresylphosphate (TCP), and the like. Examples of phthalic acid ester may be dimethyl phthalate (DMP), diethyl phthalate (DEP), dibutyl phthalate (DBP), dioctyl phthalate (DOP), diphenyl phthalate (DPP), dimethylhexyl phthalate (DEHP), and the like. Examples of citric acid ester may be o-acetyltriethyl citrate (OACTE), o-acetyltributyl citrate (OACTB), and the like. Examples of carboxylic acid ester may be butyl oleate, methylacetyl lysine oleate, dibutyl cebacate, and various kinds of trimellitic acid ester. Preferably, phthalic acid ester (DMP, DEP, DBP, DOP, DPP, DEHP) plasticizers may be used. The plasticizer is used in a content of 2~20 parts by weight, and more preferably 5~15 parts by weight, based on 100 parts by weight of cellulose acetate resin.

As the UV inhibitor, hydroxy benzophenone based compounds, benzotriazole based compounds, salicylic acid ester based compounds, cyano acrylate based compounds, and the like may be used. The UV inhibitor is used in a content of 0.1~3 parts by weight, and more preferably 0.5~2 parts by weight, based on 100 parts by weight of cellulose acetate resin.

As the deterioration inhibitor, for example, an antioxidant, a peroxide decomposer, a radical inhibitor, a metal deactivator, a deoxidant, a photo-stabilizer (hindered amine or the like), or the like may be used. Particularly preferable examples of the deterioration inhibitor may be butylated hydroxy toluene (BHT) and tribenzyl amine (TBA). The deterioration inhibitor is used in a content of 0.01~5 parts by weight, and more preferably 0.1~1 parts by weight, based on 100 parts by weight of cellulose acetate resin.

The minute particle is added in order to suppress the curl of the film, maintain transferability, prevent attachment while in a roll shape, or favorably maintain marring resistance. Any one selected from an inorganic compound and an organic compound may be used for the minute particle. For example, as the inorganic compound, a compound containing silicon, silicon dioxide, titanium oxide, zinc oxide, aluminum oxide, barium oxide, zirconium oxide, strontium oxide, antimony oxide, tin oxide, tin oxide•antimony, calcium carbonate, talc, clay, calcined kaolin, calcined calcium silicate, hydrated calcium silicate, aluminum silicate, magnesium silicate, calcium phosphate, and the like are preferable, and an inorganic compound containing silicon, zirconium oxide, and the like are more preferably usable. The minute particle may have an average first particle size of 80 nm or smaller, preferably 5~80 nm, more preferably 5~60 nm, and still more preferably 8~50 nm. If the average first particle size is above 80 nm, surface leveling property of the film may be damaged.

In the present invention, the solid concentration of the dope is favorably 15~25 wt %, and preferably 16~23 wt %. If the solid concentration of the dope is below 15 wt %, the forming of the film is difficult due to high fluidity. If the solid concentration is above 25 wt %, complete dissolution is difficult.

In the present invention, the cellulose ester resin is used in a content of 70 wt % or higher, preferably 70~90 wt %, and more preferably 80~85 wt %, based on the total solid content.

In addition, the present invention may further include 5~50 parts by weight of a cellulose triacetate resin, based on 100 parts by weight of the cellulose ester resin.

In the case where the film is manufactured by the solvent casting method, an organic solvent is preferable as a solvent for preparing the cellulose ester resin composition (dope). Halogenated hydrocarbon is preferably used as an organic solvent. Examples of the halogenated hydrocarbon may be chlorinated hydrocarbon, methylene chloride, and chloroform, and of these, methylene chloride is most preferably used.

Alternatively, as necessary, organic solvents other than the halogenated hydrocarbon may be used by mixture. Examples of the organic solvent other than the halogenated hydrocarbon may include ester, ketone, ether, alcohol, and hydrocarbon. As the ester, methylformate, ethylformate, propylformate, pentylformate, methylacetate, ethylacetate, pentylacetate, and the like may be used; as the ketone, acetone, methylethyl ketone, diethyl ketone, diisobutyl ketone, cyclopentanone, cyclohexanone, methylcyclohexanone, and the like may be used; as the ether, diisopropylether, dimethoxymethane, dimethoxyethane, 1,4-dioxane, 1,3-dioxolane, tetrahydrofuran, anisole, penetol, and the like may be used; as the alcohol, methanol, ethanol, 1-propanol, 2-propanol, 1-butanol, 2-butanol, t-butanol, 1-pentanol, 2-methyl-2-butanol, cyclohexanol, 2-fluoro-ethanol, 2,2,2-trifluoroethanol, 2,2,3,3-tetrafluoro-1-propanol, and the like may be used.

More preferably, methylene chloride may be used as a main solvent, and alcohol may be used as a sub-solvent. Specifically, methylene chloride and alcohol may be mixed at a weight ratio of 80:20~95:5, and then used.

The optical film of the present invention may be manufactured by a usual solvent casting method. More specifically, the prepared dope is first stored in a storage bath, and bubbles contained in the dope are defoamed. The defoamed dope is sent from a dope outlet to a pressurization type die through a pressurization type constant gear pump capable of sending the constant amount at high precision depending on the turn of revolutions. Then, the dope is uniformly casted on a metal supporter that is endlessly traveling from a mouthpiece (slit) of the pressurization type die, and then a half-dried dope film (also referred to as a web) is exfoliated from the metal supporter at an exfoliation point where the metal supporter almost travels. The prepared web is transferred to a tenter while the width thereof is maintained by inserting both ends thereof into clips, followed by drying. Then, the resultant web is transferred to a roller of a drying unit, followed by drying, and then a predetermined length thereof is wound by a winder.

At the time of solution coating, the space temperature is preferably −50° C. to 50° C., more preferably −30° C. to 40° C., and most preferably −20° C. to 30° C. The cellulose ester solution coated at a low space temperature is instantly cooled on the supporter, to thereby improve gel strength, and thus, a film having a lot of organic solvent residual is obtained. Therefore, the film may be exfoliated from the supporter without evaporating the organic solvent from the cellulose ester. As gas for cooling a space, ordinary air, nitrogen, argon, or helium may be used. The relative humidity is preferably 0 to 70%, and more preferably 0 to 50%.

The temperature of the supporter (casting part) on which the cellulose ester solution is coated is preferably −50° C. to 130° C., more preferably −30° C. to 25° C., and most preferably −20° C. to 15° C. In order to cool the casting part, a cooled gas may be introduced to the casting part. A cooling apparatus may be disposed in the casting part to cool the space. At the time of cooling, it is important to be careful so as prevent water from adhering to the casting part. In the case where the cooling is performed by the gas, it is preferable to dry the gas.

In addition, as necessary, surface treatment may be performed on the cellulose ester film. The surface treatment, generally, is performed in order to improve adhesive property of the cellulose ester film. As the surface treatment method, glow discharge treatment, ultraviolet irradiation treatment, corona treatment, flame treatment, saponification treatment, or the like may be employed.

In addition, the cellulose ester film may be stretched so as to control retardation. The stretching degree is preferably in the range of −10~100%, more preferably −10~50%, and most preferably −5~30%.

The thickness of the cellulose ester film is preferably in the range of 20~140 μm, and more preferably 40~80 μm.

The tear strength of the film may be measured by using the Elmendorf tear strength machine according to the JIS K 7128. If the tear strength is too low, this film may be easily damaged. Therefore, the tear strength is preferably 0.1N or higher, and more preferably 0.15N or higher.

The optical film according to the present invention may be used in a polarization plate, an optical compensation sheet, and a liquid crystal display, and one sheet or two or more sheets thereof may be laminated for use.

The polarization plate according to the present invention has the foregoing optical film of the present invention, like a protection film of a polarizer. That is, the optical film of the present invention may be used as a protection film of the polarization plate. Generally, the polarization plate includes a polarizer and two sheets of transparent protection films provided at both sides thereof. The optical film of the present invention may be used as at least one of the protection films. As the other protection film, a cellulose acrylate film generally employed may be used. The polarizer includes an iodine-containing polarizer, a dye-containing polarizer using dichromatic dye, and a polyene based polarizer. The iodine-containing polarizer and the dye-containing polarizer are generally manufactured by using a polyvinyl alcohol based film. In the case where the optical film of the present invention is used as a protection film for a polarization plate, the method for manufacturing the polarization plate is not particularly limited, and this polarization plate may be manufactured by a generally employed method. This method may include: treating a cellulose acrylate film, as the resultant material, or a cellulose acrylate film generally employed with alkali; and binding the film onto one surface or both surfaces of a polarizer manufactured by immersing and stretching a polyvinyl alcohol film in an iodine solution, using an aqueous solution of completely saponified polyvinyl alcohol.

When the optical film of the present invention is bound to the polarizer, the optical film is bound along an absorption axis of the polarizer and a length direction of the optical film of the present invention, thereby facilitating continuous manufacture.

In addition, the optical film according to the present invention may be used as a supporter for an optical compensation sheet. That is, the optical compensation sheet may be manufactured by forming an optical compensation layer on the optical film of the present invention. Preferably, an alignment layer may be provided to the optical compensation layer, as necessary.

Means, such as, rubbing treatment of an organic compound (preferably, polymer), inclined vapor deposition of an inorganic compound, and formation of a layer having micro-grooves, may be provided to the alignment layer. In addition, an alignment layer having an aligning function generated by applying an electric field, applying a magnetic field, or irradiating a light has been known. However, an alignment layer formed by rubbing treatment of the polymer is particularly preferable. The rubbing treatment is preferably carried out by rubbing a surface of a polymer layer with paper or fiber in a fixed direction several times. Preferably, the absorption axis of the polarizer and the rubbing direction are substantially parallel with each other. With respect to the kind of polymer used in the alignment layer, polyimide, polyvinyl alcohol, and the like may be preferably used. The alignment layer may have a thickness of preferably 0.01 to 5 μm, and more preferably 0.05 to 2 μm.

An optical anisotropic layer preferably contains a liquid crystal compound. As the liquid crystal compound used in the present invention, a discotic liquid crystal compound or a rod-like liquid crystal compound is particularly preferable.

A liquid crystal display according to the present invention uses the polarization plate of the present invention as described above.

The polarization plate of the present invention is bound to a liquid crystal cell of the liquid crystal display by using for example an adhesive. The optical film of the present invention is preferably provided to a liquid crystal cell—side of the polarization plate as a protection film.

The optical film may be bound to one side or both sides of the liquid crystal cell. In addition, a combination of optical films having different optical characteristics may be used.

Hereinafter, the present invention will be described by the examples in detail, but the present invention is not limited to the following examples.

Hereinafter, physical properties of the film were measured by the following methods.

1) Optical Anisotropy

Re value was measured by allowing a light of 590 nm wavelength to enter in a film normal direction by using a birefringence measurement instrument (Axoscan: product name, manufactured from Axometrics, Inc.). Rth value was obtained from the equation below by using three refractive index components of a refractive index ellipsoid, which are obtained by measuring a light of 590 nm, from 0 to 50 degrees at an interval of 10 degrees with respect to the film normal direction, using a slow axis in an Re in-plane as a tilt axis.

$$Rth=[(n_x+n_y)/2-n_z]\times d$$

$n_x$: a larger refractive index between two refractive indexes in a plane $n_y$: a smaller refractive index between two refractive indexes in a plane $n_z$: a refractive index in a thickness direction 2) Substitution Degree Substitution degree was measured according to D-817-91 of ASTM.

Example 1

Preparation of Dope

The composition of Table 1 below was put into a stirrer, and dissolved at a temperature of 30° C. The obtained dope was warmed to 30° C., transferred to a gear pump, filtered by a filter bed having an absolute filtering precision of 0.01 mm, and then again filtered by a cartridge filtering apparatus having an absolute filtering precision of 5 μm.

Here, specific kinds and substitution degrees of the substituents of the cellulose ester resin in Table 1 below are shown in Table 2 below. As the cellulose ester resin, one having a weight average molecular weight of 270,000 was used.

TABLE 1

|  | Composition (Parts by weight) |
| --- | --- |
| Cellulose ester resin | 100 |
| Methylene chloride | 445 |
| Methanol | 39 |
| Triphenyl phosphate | 6.7 |
| Biphenyl diphenyl phosphate | 3.3 |
| UV inhibitor 1 (Tinuvin 328, Ciba Company) | 1 |
| UV inhibitor 2 (Tinuvin 327, Ciba Company) | 0.5 |
| SiO$_2$ (average particle size: 50 nm) | 0.3 |

Manufacture of Cellulose Ester Film

The dope obtained through the filtering process was casted on a polished stainless supporter through a casting die, and then exfoliated therefrom. The amount of residual solvent at the time of exfoliation was controlled to be 20 wt %. After being connected to a tenter, the film was stretched by 2% in a width direction thereof (meaning length % based on 100% of the whole width). After the film was come out of the tenter, 150 mm of right and left-sided ends of the film were removed, respectively. The film of which the ends have been removed was dried by a drier. Both ends of the film come out of the drier were cut off by 3 cm, respectively, and the film was subjected to a knurling process of a 100 μm-height knurling on a portion of the film which is distanced at 10 mm from the ends thereof. Optical anisotropy of the thus obtained sample was measured by the method as described above, and the measurement results were tabulated in Table 3.

Examples 2 to 8

Each film was manufactured by the same method as Example 1, except that a cellulose ester resin in which specific kinds of substituents and substitution degrees thereof were changed at the time of preparing a dope as described in Table 2 below, was used.

Comparative Examples 1 to 3

Each film was manufactured by the same method as Example 1, except that a cellulose ester resin in which specific kinds of substituents and substitution degrees thereof were changed at the time of preparing a dope as described in Table 2 below, was used.

TABLE 2

| Cellulose ester resin | Substituent 1 | Substitution degree of Substituent 1 | Substituent 2 | Substitution degree of Substituent 2 | Substituent 3 | Substitution degree of Substituent 3 | Total substitution degree |
|---|---|---|---|---|---|---|---|
| Example 1 | Acetyl | 0.09 | Propionyl | 2.64 | t-butyldiphenylsilyl | 0.12 | 2.85 |
| Example 2 | Acetyl | 0.09 | Propionyl | 2.64 | t-butyldimethylsilyl | 0.15 | 2.88 |
| Example 3 | Acetyl | 0.09 | Propionyl | 2.64 | Diethylphosphoryl | 0.16 | 2.89 |
| Example 4 | Acetyl | 0.09 | propionyl | 2.64 | Diphenylphosphoryl | 0.11 | 2.84 |
| Example 5 | Acetyl | 1.01 | Butyryl | 1.68 | t-butyldiphenylsilyl | 0.10 | 2.79 |
| Example 6 | Acetyl | 1.01 | Butyryl | 1.68 | t-butyldimethylsilyl | 0.13 | 2.82 |
| Example 7 | Acetyl | 1.01 | Butyryl | 1.68 | Diethylphosphoryl | 0.15 | 2.84 |
| Comparative Example 1 | Acetyl | 2.87 | — | — | — | — | 2.87 |
| Comparative Example 2 | Acetyl | 0.09 | Propionyl | 2.64 | — | — | 2.73 |
| Comparative Example 3 | Acetyl | 1.01 | Butyryl | 1.68 | — | — | 2.69 |

In Table 2 above, Substituent 1, Substituent 2, and Substituent 3 mean substituents with which R of General Formula 2 below is substituted.

[General Formula 2]

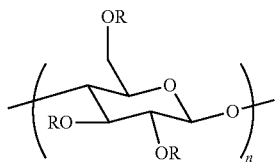

TABLE 3

| | Thickness (μm) | Re (nm) | Rth (nm) |
|---|---|---|---|
| Example 1 | 39 | 0.4 | 2.3 |
| Example 2 | 40 | 0.2 | 4.0 |
| Example 3 | 40 | 3.7 | 5.2 |
| Example 4 | 42 | 0.2 | 15.6 |
| Example 5 | 39 | 3.1 | 5.1 |
| Example 6 | 42 | 1.5 | 3.6 |
| Example 7 | 40 | 2.8 | 4.5 |
| Comparative Example 1 | 42 | 0.1 | 21.0 |
| Comparative Example 2 | 40 | 0.7 | 28.1 |
| Comparative Example 3 | 40 | 1.7 | 35.3 |

It can be seen from Table 3 above, that, in the case in which the cellulose ester resin of the present invention is used, retardation was reduced even without adding a separate retardation additive.

The invention claimed is:
1. An optical film comprising a cellulose ester resin in which some hydrogen atoms of hydroxyl groups of cellulose are substituted with two kinds of acyl groups selected from an acetyl group and a propionyl group, or an acetyl group and a butyryl group, and some hydrogen atoms of the other hydroxyl groups not substituted with the acyl groups are substituted with substituents selected from Chemical Formula 1 or Chemical Formula 2:

[Chemical Formula 1]

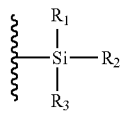

(In Chemical Formula 1, $R_1$, $R_2$ and $R_3$ each are independently selected from the group consisting of H, (C1-C10)alkyl, and (C6-C30)aryl; and the alkyl and aryl may be further substituted with at least one of (C1-C10)alkyl, halogen, nitro, cyano, hydroxyl, amino, (C6-C30)aryl, (C2-C10)alkenyl, (C3-C20)cycloalkyl, 5-membered to 7-membered heterocycloalkyl containing at least one atom selected from N, O, and S, or (C4-C30)heteroaryl containing at least one atom selected from N, O, and S),

[Chemical Formula 2]

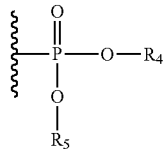

(In Chemical Formula 2, $R_4$ and $R_5$ each are independently selected from the group consisting of (C1-C10)alkyl and (C6-C30)aryl; and the alkyl and aryl may be further substituted with at least one of (C1-C10)alkyl, halogen, nitro, cyano, hydroxyl, amino, (C6-C30)aryl, (C2-C10)alkenyl, (C3-C20)cycloalkyl, 5-membered to 7-membered heterocycloalkyl containing at least one atom selected from N, O, and S, or (C4-C30)heteroaryl containing at least one atom selected from N, O, and S), wherein the optical film includes a cellulose ester resin in which substitution degrees of the acyl groups satisfy Equations 1 and 3, or Equations 2 and 4 below and a substitution degree of a substituent selected from Chemical Formula 1 or Chemical Formula 2 is 0.01~1.0:

$1.9 \leq DSac+DSpr < 2.8$ [Equation 1]

$1.9 \leq DSac+DSbu < 2.8$ [Equation 2]

$1.8 \leq DSpr < 2.7$ [Equation 3]

$1.6 \leq DSbu < 2.7$ [Equation 4]

(In Equations 1 to 4, DSac means substitution degree of acetyl group, DSpr means substitution degree of propionyl group, and DSbu means substitution degree of butyryl group).

2. The optical film of claim 1, wherein in Chemical Formula 1, $R_1$, $R_2$ and $R_3$ each are independently selected from the group consisting of (C1-C10)alkyl and (C6-C30)aryl.

3. The optical film of claim 2, wherein the Chemical Formula 1 is selected from the group consisting of t-butyldiphenylsilyl, t-butyldimethylsilyl, trimethylsilyl, triethylsilyl, tri-isopropylsilyl, dimethylisopropylsilyl, diethylisopropylsilyl, tribenzylsilyl, triphenylsilyl, and di-t-butylmethylsilyl.

4. The optical film of claim 1, wherein in Chemical Formula 2, $R_4$, and $R_5$ each are independently selected from the group consisting of (C1-C10)alkyl and (C6-C30)aryl.

5. The optical film of claim 4, wherein the Chemical Formula 2 is selected from the group consisting of diethylphosphoryl, dimethylphosphoryl, diphenylphosphoryl, dibenzylphosphoryl, diisopropylphosphoryl, and diisobutylphosphoryl.

6. The optical film of claim 1, further comprising 5~50 parts by weight of a cellulose triacetate resin based on 100 parts by weight of the cellulose ester resin.

7. An optical compensation sheet comprising the optical film of claim 1.

8. A retardation film comprising the optical film of claim 1.

9. A polarization plate comprising the optical film of claim 1.

10. A liquid crystal display comprising the optical film of claim 1.

* * * * *